(12) United States Patent
Jeong et al.

(10) Patent No.: US 10,584,043 B2
(45) Date of Patent: *Mar. 10, 2020

(54) CAPACITIVE DEIONIZATION APPARATUS AND METHODS OF TREATING FLUID USING THE SAME

(71) Applicant: Samsung Electronics Co., Ltd., Suwon-Si, Gyeonggi-Do (KR)

(72) Inventors: Joon Seon Jeong, Seoul (KR); Hyun Seok Kim, Seoul (KR); Da Hye Park, Anyang-si (KR); Dong Jin Ham, Anyang-si (KR); Hyo Rang Kang, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 713 days.

This patent is subject to a terminal disclaimer.

(21) Appl. No.: 14/039,104

(22) Filed: Sep. 27, 2013

(65) Prior Publication Data

US 2014/0144779 A1     May 29, 2014

(30) Foreign Application Priority Data

Nov. 29, 2012    (KR) .................. 10-2012-0137017

(51) Int. Cl.
    *C02F 1/469*           (2006.01)
    *B03C 5/02*            (2006.01)

(52) U.S. Cl.
    CPC .............. *C02F 1/4691* (2013.01); *B03C 5/02* (2013.01)

(58) Field of Classification Search
    CPC ................................. C02F 1/4691; B03C 5/02
    See application file for complete search history.

(56) References Cited

U.S. PATENT DOCUMENTS

| | | |
|---|---|---|
| 4,082,694 A | 4/1978 | Wennerberg et al. |
| 4,285,831 A | 8/1981 | Yoshida et al. |
| 4,346,067 A | 8/1982 | Wachter |
| 4,382,599 A | 5/1983 | Tilbor |
| 5,057,296 A | 10/1991 | Beck |

(Continued)

FOREIGN PATENT DOCUMENTS

| | | |
|---|---|---|
| EP | 01031645 A1 | 8/2000 |
| EP | 2112125 A1 | 10/2009 |

(Continued)

OTHER PUBLICATIONS

Extended European Search Report dated Mar. 13, 2014, issued in European Application No. 13192838.4.

(Continued)

*Primary Examiner* — Salil Jain
(74) *Attorney, Agent, or Firm* — Harness, Dickey & Pierce, P.L.C.

(57) ABSTRACT

A capacitive deionization apparatus may include at least one pair of porous electrodes and a spacer structure disposed between the at least one pair of electrodes. The at least one pair of porous electrodes may include an electrode material having a surface area for the electrostatic adsorption of feed ions. The spacer structure may include an electrically-insulating material with an ion exchange group on the surface thereof. The spacer structure provides a path for flowing a fluid therethrough.

18 Claims, 8 Drawing Sheets

(56) References Cited

U.S. PATENT DOCUMENTS

| | | | |
|---|---|---|---|
| 5,192,432 A | 3/1993 | Andelman | |
| 5,415,768 A * | 5/1995 | Andelman | B01D 15/36 |
| | | | 204/600 |
| 5,447,636 A * | 9/1995 | Banerjee | H01M 8/1023 |
| | | | 156/308.6 |
| 5,482,599 A | 1/1996 | Watanabe | |
| 5,626,977 A | 5/1997 | Mayer et al. | |
| 6,051,205 A | 4/2000 | Yamamoto et al. | |
| 6,359,019 B1 | 3/2002 | Stone et al. | |
| 6,383,980 B1 | 5/2002 | Hagihara et al. | |
| 6,423,205 B1 * | 7/2002 | Akahori | B01D 61/48 |
| | | | 205/636 |
| 6,835,688 B2 | 12/2004 | Morikawa et al. | |
| 7,582,684 B2 | 9/2009 | Rasmussen et al. | |
| 7,641,819 B2 | 1/2010 | Dejesus et al. | |
| 7,727,675 B2 | 6/2010 | Cho et al. | |
| 7,816,052 B2 | 10/2010 | Cho et al. | |
| 8,158,196 B2 | 4/2012 | Moya | |
| 2002/0167782 A1 * | 11/2002 | Andelman | C02F 1/008 |
| | | | 361/302 |
| 2003/0173222 A1 * | 9/2003 | Srinivasan | B01D 61/48 |
| | | | 204/524 |
| 2004/0012913 A1 * | 1/2004 | Andelman | C02F 1/4691 |
| | | | 361/503 |
| 2005/0036270 A1 | 2/2005 | Faris et al. | |
| 2007/0051684 A1 | 3/2007 | Grebenyuk et al. | |
| 2007/0248760 A1 | 10/2007 | Chmelka et al. | |
| 2010/0096269 A1 | 4/2010 | Kaku et al. | |
| 2010/0238606 A1 | 9/2010 | Dreissig et al. | |
| 2011/0042205 A1 | 2/2011 | Kim et al. | |
| 2011/0147212 A1 | 6/2011 | Kim et al. | |
| 2011/0162965 A1 | 7/2011 | Kim et al. | |
| 2012/0093908 A1 | 4/2012 | Kim et al. | |
| 2012/0178619 A1 | 7/2012 | Ji et al. | |
| 2012/0178834 A1 * | 7/2012 | Linder | B01D 67/0006 |
| | | | 521/27 |
| 2012/0228215 A1 | 9/2012 | Yang et al. | |
| 2013/0075260 A1 * | 3/2013 | Reinhoudt | C02F 1/4691 |
| | | | 204/555 |
| 2013/0129592 A1 | 5/2013 | Kim et al. | |
| 2013/0178356 A1 | 7/2013 | Kim et al. | |
| 2013/0264209 A1 | 10/2013 | Kwon et al. | |

FOREIGN PATENT DOCUMENTS

| | | |
|---|---|---|
| JP | 4065664 B2 | 3/2008 |
| KR | 20030070398 A | 8/2003 |
| KR | 20050072089 A | 7/2005 |
| KR | 20090036596 A | 4/2009 |
| KR | 20090094161 A | 9/2009 |
| KR | 10-2011-0019573 A | 2/2011 |
| KR | 101029090 B1 | 4/2011 |
| KR | 20110071701 A | 6/2011 |
| KR | 10-2011-0080893 A | 7/2011 |
| KR | 20120040593 A | 4/2012 |
| KR | 20120081845 A | 7/2012 |
| KR | 20120101789 A | 9/2012 |
| KR | 20130056649 A | 5/2013 |
| KR | 10-2013-0081012 A | 7/2013 |
| KR | 20130072761 A | 7/2013 |
| KR | 10-2013-0113817 A | 10/2013 |
| WO | WO-01017680 A1 | 3/2001 |
| WO | WO-01/90443 A1 | 11/2001 |

OTHER PUBLICATIONS

Li, et al., "Ion-exchange membrane capacitive deionization: A new strategy for brackish water desalination", Desalination 275 (2011) pp. 62-66.

Yoram Oren, "Capacitive deionization (CDI) for desalination and water treatment-past, present and future (a review)", ScienceDirect, Desalination 228 (2008) pp. 10-29.

U.S. Appl. No. 14/299,217, filed Jun. 9, 2014.

Korean Office Action for corresponding Application No. 10-2012-0137017 dated Jan. 2, 2019, English translation thereof.

* cited by examiner

CAPACITIVE DEIONIZATION APPARATUS AND METHODS OF TREATING FLUID USING THE SAME

CROSS-REFERENCE TO RELATED APPLICATION

This application claims priority under 35 U.S.C. § 119 to Korean Application No. 10-2012-0137017, filed in the Korean Intellectual Property Office on Nov. 29, 2012, the entire contents of which are incorporated herein by reference.

BACKGROUND

1. Field

The present disclosure relates to a deionization apparatus and a method of treating fluid using the same.

2. Description of the Related Art

In some parts of the world, the water supply may include a relatively large amount of minerals. For instance, in Europe, limestone is frequently found in underground water. Thus, the tap water in these regions may contain a relatively large amount of minerals. Water having relatively high mineral content (i.e., hard water) may cause problems, including frequent occurrences of limescales in the interior walls of pipes and decreases in energy efficiency when such water is used in home installations such as heat exchangers and/or boilers. Moreover, hard water is improper to use as wash water. Therefore, an appropriate technology is utilized for removing ions from hard water to make it into soft water, in particular, in an environmentally-friendly manner. Furthermore, the use of seawater desalination to obtain water has been increasing as larger and more populated areas begin to experience water shortages.

A capacitive deionization (CDI) apparatus is a device that applies a voltage to porous electrodes having nano-sized pores to provide them with a polarity. As a result, ionic materials are adsorbed from a medium, such as hard water, onto the surface of the electrodes, thereby removing the same therefrom. In the CDI apparatus, when a medium containing dissolved ions flows between two electrodes of a positive electrode and a negative electrode and DC power having a relatively low potential difference is applied thereto, the anionic components and the cationic components among the dissolved ions are adsorbed and concentrated onto the positive electrode and the negative electrode, respectively. When an electric current flows in a reverse direction between the two electrodes by, for example, short-circuiting the two electrodes, the concentrated ions are detached from the electrodes.

SUMMARY

Some embodiments of the present disclosure relate to a capacitive deionization apparatus having improved deionization efficiency.

Some embodiments of the present disclosure relate to a spacer structure for the capacitive deionization apparatus.

Some embodiments of the present disclosure relate to a method of removing ions from a fluid using the capacitive deionization apparatus.

According to an example embodiment of the present disclosure, a capacitive deionization apparatus may include at least one pair of porous electrodes including an electrode material having a surface area for electrostatic adsorption of feed ions, and a space structure disposed between the pair of porous electrodes to provide a path for flowing a fluid therebetween and including an electrically-insulating material, wherein the spacer structure includes an ion exchange group on the surface thereof.

The capacitive deionization apparatus may include a charge barrier that is disposed between the porous electrode and the spacer structure and includes a different base material from that of the electrode material.

In the capacitive deionization apparatus, the porous electrodes may include a conductive agent and an ionically conductive binder.

Another example embodiment of the present disclosure relates to a spacer structure for a capacitive deionization apparatus. The spacer structure defines a space therein for fluid to flow therethrough. The spacer structure is made of an electrically-insulating material and includes an ion exchange group on the surface thereof so as to have an equivalent series resistance (ESR) ranging from about 1 ohm/cm$^2$ to about 300 ohms/cm$^2$, as measured under an electrolyte condition of 20 mg/L of NaCl.

The spacer structure may include an ion exchangeable polymer coated on the surface thereof.

Another example embodiment of the present disclosure relates to a method of treating a fluid, which includes providing a capacitive deionization apparatus that includes at least one pair of porous electrodes including an electrode material having a surface area for electrostatic adsorption of feed ions, and a space structure being disposed between the pair of electrodes to provide a path for flowing a fluid therebetween and including an electrically-insulating material, wherein the spacer structure includes an ion exchange group on the surface thereof; and supplying a fluid including ions through the path for flowing the fluid into the capacitive deionization apparatus and applying a voltage between the pair of electrodes to adsorb the ions between the pair of electrodes and remove them from the fluid.

The method of treating a fluid may further include short-circuiting the pair of electrodes or applying a voltage in a reverse direction between the electrodes to detach the ions adsorbed to the electrode.

DETAILED DESCRIPTION

Figure 1:
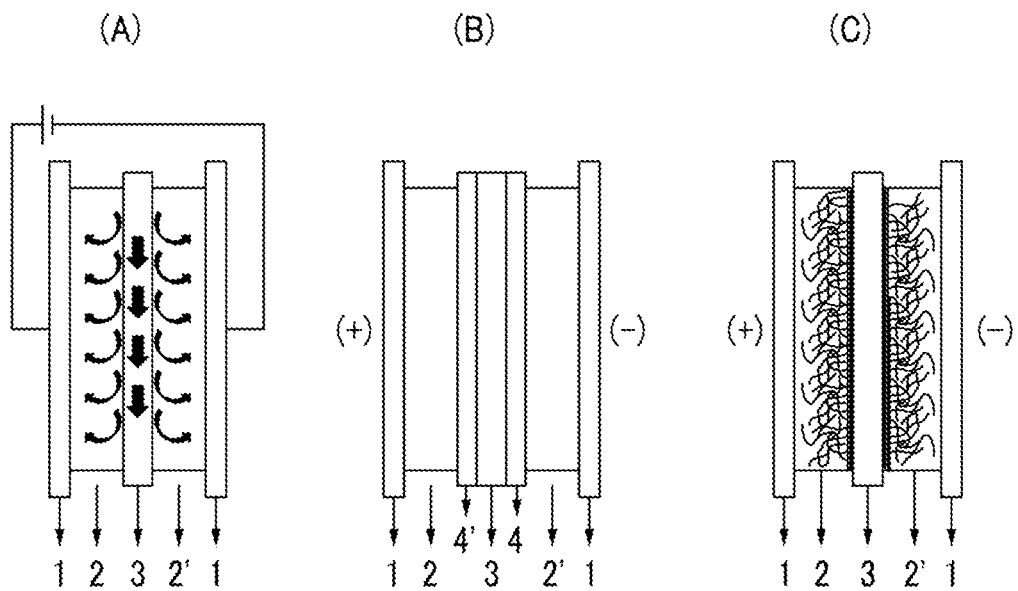
FIGS. 1(A)-(C) are schematic views of non-limiting examples of a capacitive deionization apparatus.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, the term "capacitive deionization apparatus" refers to a device that may separate/concentrate ions by passing fluids including at least one ion component to be separated or to be concentrated through the flow path formed between at least one pair of porous electrodes and applying a voltage thereto so as to adsorb the ion components onto the surfaces of the pores in the electrodes. The capacitive deionization apparatus may have any geometry.

As used herein, the term "porous electrode" refers to a conductive structure including an electrically-conductive material and having a relatively high specific surface area due to the presence of pores therein having a diameter of nano-meters or larger, for example, about 0.5 nm to about 5 µm.

As used herein, "ion exchangeable polymer" may refer to a polymer including an ion exchangeable group in the main chain or the side chain of the polymer.

The capacitive deionization apparatus according to an example embodiment may include at least one pair of porous electrodes and a spacer structure disposed between the at least one pair of porous electrodes. The at least one pair of porous electrodes includes an electrode material having a surface area for electrostatic adsorption of feed ions. The electrode material may have a conductivity of at least $10^2$ S/m at 20° C. The spacer structure is configured to provide a path for flowing a fluid therethrough. The spacer structure includes an electrically-insulating material and an ion exchange group on the surface thereof. The electrically-insulating material may have a resistivity of at least $10^{10}$ Ω·m at 20° C.

The porous electrode may be a positive electrode or a negative electrode. The porous electrode may be a negative electrode having a cation exchange group or a positive electrode having an anion exchange group. The thickness of the electrode is not particularly limited, and may be appropriately selected. For example, the electrode may have a thickness of about 50 µm to about 500 µm, and specifically, about 100 µm to 300 µm.

The porous electrode may be combined with a current collector. When multiple pairs of electrodes are included in the apparatus, both sides of the current collector may be combined with the electrodes, respectively. The current collector is electrically connected to a power source, thereby applying a voltage to the electrodes. The current collector may include a graphite plate or a graphite foil. The current collector may also include at least one metal selected from the group consisting of Cu, Al, Ni, Fe, Co, and Ti, or a metal mixture or alloy thereof.

The electrode material may include a porous electrically-conductive material having an electrical double layer capacitance, which may be used alone or in a combination. Non-limiting examples of the porous electrically-conductive material may include at least one selected from the group consisting of activated carbon, carbon aerogel, carbon nanotubes (CNT), mesoporous carbon, activated carbon fiber, graphite oxide, and a metal oxide. The porous electrically-conductive material may have a shape of a fiber, a particle, or may be in any shape. The porous electrically-conductive material may have a specific surface area of about 500 to 1500 m$^2$/g, and specifically, of about 700 to 1200 m$^2$/g.

The porous electrode may further include a conductive agent for enhancing the electrical conductivity of the electrode. Types of the conductive agent are not particularly limited, and it is possible to use any materials that are typically used for fabricating electrodes. By way of non-limiting examples, the conductive agent may be selected from carbon materials such as carbon black, vapor growth carbon fiber (VGCF), natural graphite, artificial graphite, acetylene black, ketjen black, and a carbon fiber; metal materials such as a metal powder or a metal fiber of copper, nickel, aluminum, and silver; conductive polymers such as a polyphenylene derivative; or a mixture thereof.

The porous electrode may further include a binder for binding a plurality of porous electrically-conductive materials to each other to provide a continuous structure and/or for attaching each electrode to a current collector. Types of binder are not particularly limited, and may include any binder typically used for the preparation of electrodes. By way of non-limiting examples, specific examples of the binder may include polystyrene, polyvinylalcohol, carboxylmethylcellulose, hydroxypropylcellulose, polyvinylchloride, carboxylated polyvinylchloride, polyvinylfluoride, polyamide, polyvinylpyrrolidone, polyurethane, polytetrafluoroethylene, polyvinylidene fluoride, polyethylene, polypropylene, a styrene-butadiene rubber, an acrylated styrene-butadiene rubber, epoxy resin, polyacrylamide, and a mixture thereof.

Alternatively, the porous electrode may include a binder having a cation exchange group, and may be used as a negative electrode having a cation exchange group. As a further alternative, the porous electrode may include a binder having an anion exchange group, and may be used as a positive electrode having an anion exchange group. By way of non-limiting examples, the binder having an anion or a cation exchange group may be a polymer having a cation exchange group selected from a sulfonic acid group (—SO$_3$H), a carboxyl group (—COOH), a phosphonic acid group (—PO$_3$H$_2$), a phosphinic acid group (—HPO$_3$H), an arsenic acid group (—AsO$_3$H$_2$), and a selenonic acid group (—SeO$_3$H), or a polymer having an anion exchange group selected from a quaternary ammonium salt (—NH$_3^+$), a primary, secondary, or tertiary amine group (—NH$_2$, —NHR, —NR$_2$), a quaternary phosphonium group (—PR$_4^+$), and a tertiary sulfonium group (—SR$_3^+$), in a main chain or side chain of the binder polymer. Such polymers may be prepared by any known, proper methods or obtained from commercially available sources.

The spacer structure disposed between the pair of electrodes forms one or more paths for flowing a fluid (e.g., a flow channel) between the electrodes and includes an electrically-insulating material to prevent a short circuit. The spacer structure has ion exchange groups introduced on the surface thereof.

The spacer structure may be formed with any material that is capable of providing a flow channel for a fluid and preventing the electrodes from being short-circuited, and may have any of a variety of shapes. For a non-limiting example, the spacer structure may be an open mesh, non-woven fabric, woven fabric, or foam shape. By way of non-limiting examples, the spacer structure may include polyesters such as polyethylene terephthalate; polyolefins such as polypropylene and polyethylene; polyamides such as nylon; an aromatic vinyl-based polymer such as polystyrene; cellulose derivatives such as cellulose, methyl cellulose, and acetylmethyl cellulose; polyetherether ketone; polyimides; polyvinylchlorides; or a combination thereof. The thickness of the spacer structure is not particularly limited, but it may range from about 50 μm to about 500 μm, and specifically, from about 100 μm to about 300 μm, depending on the flow rate and the solution resistance. The open area of the spacer structure may range from about 20% to about 80%, and specifically, from about 30% to about 50%, depending on the flow rate and the solution resistance.

The spacer structure includes an ion exchange group on the surface thereof, which may play a role in lowering the solution resistance of a fluid flowing therethrough. For instance, the ion exchange group may be on the exterior surfaces as well as the interior surfaces that define the pores/open areas within the spacer structure. The ion exchange group may be a cation exchange group selected from a sulfonic acid group (—SO$_3$H), a carboxyl group (—COOH), a phosphonic acid group (—PO$_3$H$_2$), a phosphinic acid group (—HPO$_3$H), an arsenic acid group (—AsO$_3$H$_2$), and a selenonic acid group (—SeO$_3$H), or an anion exchange group selected from a quaternary ammonium salt (—NH$_3^+$), a primary, secondary, or tertiary amine group (—NH$_2$, —NHR, —NR$_2$), a quaternary phosphonium group (—PR$_4$), and a tertiary sulfonium group (—SR$_3$).

In a conventional capacitive deionization apparatus, the ions in the fluid (e.g., water) may be removed at a relatively high efficiency when the concentration of ions to be removed is within a predetermined level (e.g., less than or equal to about 2000 ppm). However, when the ion concentration of the feed solution is relatively low, for example, 500 ppm or lower, such a low level of the ion concentration of water passing between the pair of electrodes results in a higher level of the solution resistance applied in the flow channel. Thereby, a higher degree of voltage drop may occur in the flow channel. As a result, the driving voltage that may be used as a real driving force for the ion adsorption from the voltage applied to the pair of electrodes is sharply decreased, and this lead to a lower efficiency for the adsorption. Thereby, it may be difficult to obtain a treated solution having a high purity of about 60 uS/cm or less by using a conventional capacitive deionization apparatus.

In contrast, with a capacitive deionization apparatus according to example embodiments of the present disclosure, the spacer structure that may prevent the short-circuit and serve as a flow path between the electrodes has an ion exchange group on the surface. As a result, the solution resistance in the flow path may be maintained at a relatively low level even when a feed solution having a relatively low ion concentration passes therethrough. In addition, it is possible to decrease the degree of the voltage drop in the flow path. Accordingly, the overall deionization efficiency may become higher, and it is possible to produce treated water having a relatively high purity (e.g., having an ion concentration of about 15 ppm or less), and the device may be operated at a relatively high flow rate.

The spacer structure having an ion exchange group on the surface may be prepared by coating an ion exchange polymer on the surface of the spacer structure. For instance, the ion exchange polymer may coat the exterior surfaces as well as the interior surfaces that define the pores/open areas within the spacer structure. Examples of the ion exchange polymer may include, but are not limited to, a sulfonated tetrafluoroethylene fluoro polymer or copolymer, a carboxylate polymer, a sulfonated polymer (e.g., sulfonated polystyrene and the like), polyethyleneimine, poly(acrylamido-N-propyltrimethylammonium chloride (PolyAPTAC), poly (2-acrylamido-2-methyl-1-propane sulfonic acid (PolyAMPS), and the like. The ion exchange polymer may be synthesized as necessary or obtained from commercially available sources. Examples of commercially available polymer products may include, but are not limited to, Nafion manufactured by DuPont. When the spacer structure having an ion exchange group is prepared by coating, the surface coating thickness may range from about 0.5 μm to about 50 μm, and specifically, from about 1 μm to about 10 μm.

The spacer structure including an ion exchange group on the surface may have an equivalent series resistance of about 0.1 ohms/cm² to about 500 ohms/cm², and specifically about 1 to about 300 ohms/cm², as measured under an electrolyte condition of 20 mg/L NaCl. In addition, the ion exchange capacity of the spacer structure including the ion exchange group on the surface may range from about 0.01 meq/g to about 10 meq/g, and specifically, from about 0.1 meq/g to about 1 meq/g.

The capacitive deionization apparatus according to an example embodiment may further include a charge barrier disposed between the spacer structure and the porous electrode. The charge barrier may be a cation permselective membrane or an anion permselective membrane. The cation or anion permselective membrane may be prepared by a known, appropriate method or obtained from a commercially available source. Examples of cation or anion permselective membranes, which may be used in the capacitive deionization apparatus, may include, but are not limited to, Neosepta CMX, Neosepta AMX, or the like manufactured by Tokuyama.

The capacitive deionization apparatus may have any geometry or structure depending on the application. By way of non-limiting examples, the capacitive deionization apparatus may have a schematic structure as shown in FIG. 1(A) to FIG. 1(C). Hereinafter, the capacitive deionization apparatus will be explained with reference to the drawings. Referring to FIG. 1(A), porous electrodes 2 and 2' are coated on a current collector 1, and a spacer structure 3 is inserted between the porous electrodes 2 and 2' to provide a flow path.

In the capacitive deionization apparatus shown in FIG. 1(B), porous electrodes 2 and 2' are coated on a current collector 1; a spacer structure 3 is inserted between the porous electrodes 2 and 2' to provide a flow path; and charge barriers 4 and 4' are inserted between the porous electrodes 2 and 2' and the spacer structure 3. In particular, the charge barrier 4 may be disposed between the porous electrode 2' and the spacer structure 3, while the charge barrier 4' may be disposed between the porous electrode 2 and the spacer structure 3. The charge barrier 4 may be a cation permselective membrane or anion permselective membrane, while the charge barrier 4' may be the other of the cation permselective membrane or anion permselective membrane.

In the capacitive deionization apparatus shown in FIG. 1(C), the porous electrodes 2 and 2' are coated on a current collector 1; and a spacer structure 3 is inserted between the porous electrodes 2 and 2' to define a flow path, wherein the porous electrode 2 is a positive electrode (or a negative electrode) using an anion (or cation) exchange binder, and the electrode 2' is a negative electrode (or a positive electrode) using a cation (or anion) exchange binder.

In the capacitive deionization apparatuses shown in FIG. 1(A) to FIG. 1(C), when a voltage is applied between the porous electrodes 2 and 2' while a feed solution passes through the flow path defined by the spacer structure 3, an electrostatic force causes the ions in the feed solution to be adsorbed onto the porous electrodes 2 and 2' and thereby removed from the feed solution. Accordingly, the electrical resistance is higher at the outlet of the treated solution than at the inlet of the feed solution. For example, when the feed solution is a NaCl solution having a concentration of 100 ppm, the conductivity of the feed solution corresponds to about 200 uS/cm, and the resistivity is about 5000 Ω·cm. If the apparatus removes about 70% of the ions from the feed solution, the treated solution therein has a conductivity of about 60 uS/cm and a resistivity of about 16666.7 Ω·cm. Meanwhile, water may be decomposed at a potential of about 1.2 V or higher. Therefore, the capacitive deionization apparatus may not be operated at a potential of several volts or higher even when a higher operating potential may enhance the efficiency of the ion removal. In the capacitive deionization apparatus according to an example embodiment, the spacer structure includes an ion exchange group on the surface, and therefore, the solution resistance occurring in the flow path may decrease and thus a lower level of voltage is required for driving the apparatus. This means that the ion removal capacity of the apparatus having a spacer with ion exchange group according to the present disclosure may be higher than a conventional one without ion exchange group on the basis of an equivalent volume. Particularly, the solution resistance may be maintained at a relatively low level even when water having a relatively low ion content flows through the flow channel. As a result, it is possible to provide a treated solution having a higher purity.

According to another example embodiment, the spacer structure is disposed between a pair of electrodes in the capacitive deionization apparatus to define a channel for flowing a fluid. The structure may be made of the electrically insulating material and includes an ion exchange group on the surface thereof, so that its equivalent series resistance (ESR) ranges from about 1 to about 300 ohms/cm² as measured under an electrolyte condition of about 20 mg/L NaCl. The details of the spacer structure may be the same as previously described in connection with the capacitive deionization apparatus.

According to a further example embodiment, a method of treating a fluid may include (a) providing a capacitive deionization apparatus including at least one pair of porous electrodes and a spacer structure disposed between the pair of electrodes, the porous electrodes including an electrode material having a surface area for the electrostatic adsorption of feed ions, the spacer structure including an electrically-insulating material and providing a path for flowing a fluid therethrough, wherein the spacer structure includes an ion exchange group on the surface thereof; and (b) supplying a fluid including feed ions through the path for flowing the fluid into the capacitive deionization apparatus and applying a voltage between the pair of electrodes to adsorb the feed ions between the pair of electrodes and remove them from the fluid.

The method of treating a fluid may further include (c) short-circuiting the pair of electrodes or applying a reverse-direction voltage between the pair of electrodes to detach the adsorbed feed ions therefrom.

The details of the capacitive deionization apparatus may be the same as described above.

The fluid including the ions, supplied into the capacitive deionization apparatus, is not particularly limited, but, for example, it may be sea water, or it may be hard water containing calcium ions or magnesium ions. According to the method of treating a fluid, the solution resistance occurring in the flow path may be maintained at a relatively low level even if the fluid includes ions at a relatively low concentration, so that the treated solution may have relatively high purity. The rate of supplying the fluid is not particularly limited, but may be adjusted if required. For example, the rate may range from about 5 to about 50 ml/minute.

When a DC voltage is applied to the electrode while supplying the fluid, the ions present in the fluid are adsorbed onto the surface of the electrode. The applied voltage may be appropriately selected in light of the cell resistance, the concentration of the solution, or the like. For example, the applied voltage may be about 2.5 V or lower, and specifically, may range from about 1.0 V to about 2.0 V. When the voltage is applied, the ion removal efficiency, as calculated from the measurement of the ion conductivity difference between inlet and outlet of the fluid, may be about 50% or higher, specifically, about 75% or higher, and more specifically, about 90% or higher.

The aforementioned capacitive deionization apparatus and the aforementioned methods may find their utility in most home appliances using water, for example, a washing machine, a refrigerator, a water softener, or the like, and may also be used in an industrial water treatment device such as for seawater desalination and ultrapure water manufacture.

The following illustrate example embodiments of the present disclosure in more detail. However, it is understood that the scope of the present disclosure is not limited to these examples.

EXAMPLES

Manufacture of Spacer Structure and EIS Analysis

Preparation Example 1

A polyamide mesh (mesh opening: 125 um, mesh thickness: 100 um, Trade name: NITEX 03-125/45, Sefar AG) is immersed in a 5% Nafion solution for 10 minutes, and then dried at room temperature for 3 to 4 hours and washed with deionized water at 25° C. for 24 hours to provide a spacer structure having a cation exchange group introduced on the surface thereof.

Preparation Example 2

A spacer structure having a cation exchange group introduced on the surface thereof is obtained in accordance with the same manner as set forth in Preparation Example 1, except for using a polyethylene terephthalate mesh (mesh opening: 120 um, mesh thickness: 140 um, Trade name: PETEX 07-120/34, Sefar AG).

Experimental Example 1: Electrochemical Impedance Spectroscopy: (EIS) Analysis of Spacer Structure (1) Preparation of Samples The spacer structures obtained from Preparation Example 1 and Preparation Example 2 and a corresponding mesh not being immersed in a Nafion solution (Comparative Preparation Example 1: NITEX 03-125/45, Comparative Preparation Example 2: PETEX 07-120/34) are immersed in 2 M NaCl solution for 1 hour and washed with distilled water.

(2) EIS Measurement

Figure 2:
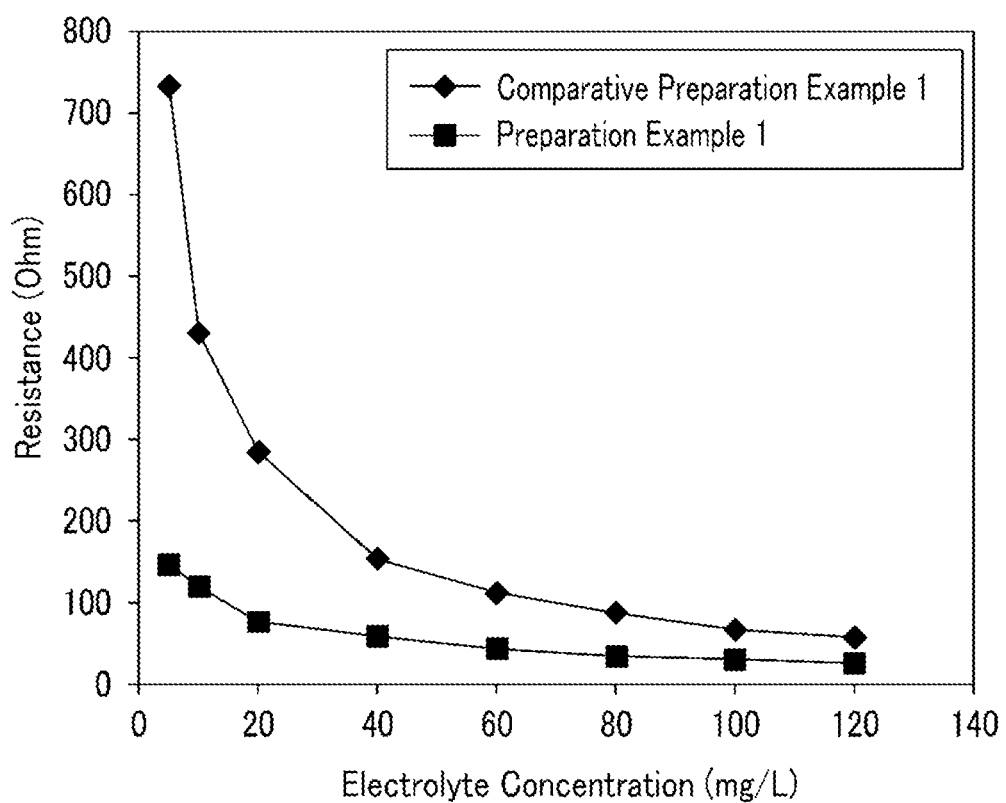
FIG. 2 is a graph plotting changes in equivalent series resistance over the electrolyte concentration in the spacer structures obtained from Preparation Example 1 and Comparative Preparation Example 1.

EIS is measured under the following conditions, and the results are shown in FIG. 2.

Figure 3:
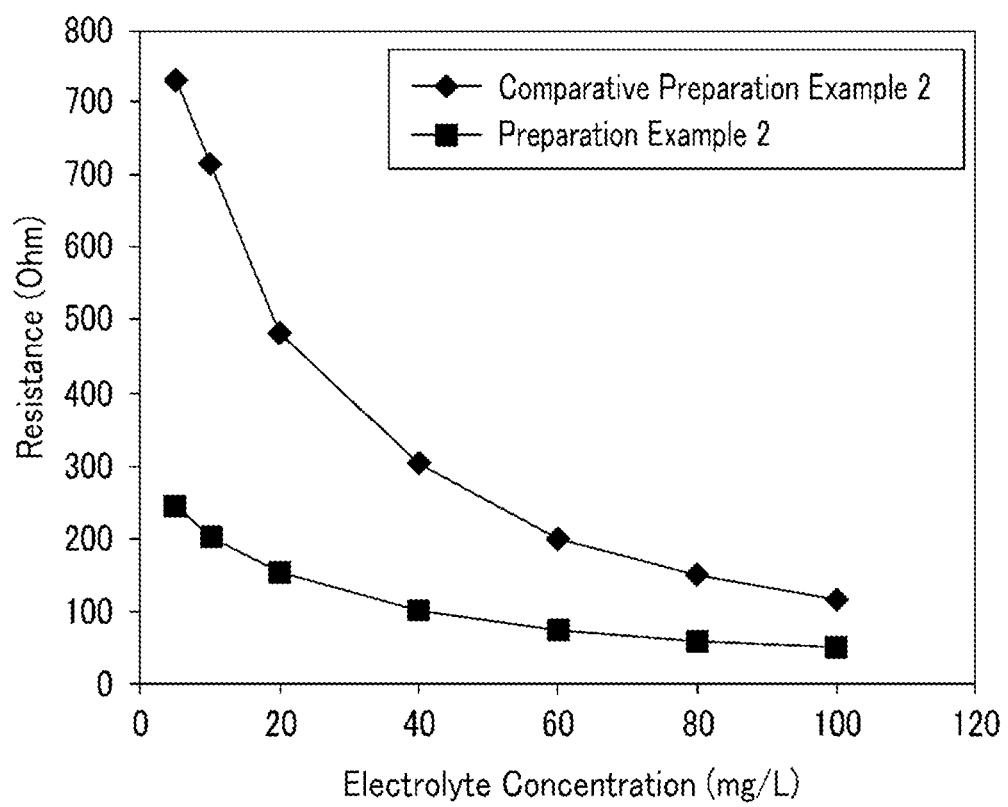
FIG. 3 is a graph plotting changes in equivalent series resistance over the electrolyte concentration in the spacer structures obtained from Preparation Example 2 and Comparative Preparation Example 2.

Mesh surface area: 1.13 cm$^2$
Electrode as used: stainless steel
Electrolyte: 5-120 ppm NaCl
Frequency: 1 Hz-1 MHz
Amplitude: 5 mV
DC bias voltage: 0 V As shown in FIGS. 2 and 3, the spacer structures (Preparation Example 1 and Preparation Example 2) including a Nafion coating show a considerably lower value of equivalent series resistance than those of Comparative Preparation Example 1 and Comparative Preparation Example 2 that include no Nafion coating. Additionally, such differences increase as the concentration of the electrolyte decreases. Accordingly, the spacer structures prepared from Preparation Example 1 and Preparation Example 2 make it possible to remove the ions more effectively even when they are used for treating a fluid having a relatively low ion concentration.

Manufacture of Capacitive Deionization Apparatus and Evaluation of Ion Adsorption Performance

Example 1: Manufacture of CDI

1) Manufacture of Electrode: Electrode Coated with Activated Carbon Slurry 6 g of activated carbon, 0.5 g of carbon black, 1 g of polyvinylidene fluoride (PVdF), and 20 g of dimethyl acetamide are added to an agitating container to provide a slurry. The slurry is coated on a conductive graphite sheet and dried.

2) Assembly of Capacitive Deionization Apparatus

The electrode coated with an activated carbon slurry obtained by the above procedure as set forth in item 1) is used as an positive electrode and a negative electrode, and the spacer structure obtained from Preparation Example 1 is used to prepare an assembly, wherein a graphite sheet/activated carbon electrode coating (thickness: 200 μm)/spacer/activated carbon electrode coating (thickness: 200 μm)/graphite sheet are stacked in this order in a housing, as shown in FIG. 1(A). The housing is fastened with a screw.

Comparative Example 1

An apparatus is fabricated using the same electrode as in Example 1 in the same manner as set forth in Example 1, except that the spacer structure is a polyamide mesh (Trade name: NITEX 03-125/45, Sefar AG) without a Nafion coating.

Example 2

1) Manufacture of Negative Electrode Having Cation Exchange Group 1.0 g of polystyrene having a cation exchange group prepared by the sulfonation reaction and 20 g of dimethyl acetamide (DMAc) are mixed to provide a polymer solution, and 6.0 g of activated carbon powder (specific surface area=1600 m$^2$/g), 0.5 g of carbon black (average diameter=19 nm) are mixed to provide a cation exchange electrode slurry. The prepared slurry is coated on a conductive graphite sheet (thickness=380 μm) by a doctor blade method to provide a 200 μm thick coating on a side and the resulting product is dried at room temperature to provide a negative electrode having a cation exchange group.

2) Manufacture of Positive Electrode Having Anion Exchange Group 1.0 g of polystyrene having an anion exchange group prepared by an amination reaction and 20 g of dimethyl acetamide (DMAc) are mixed to provide a polymer solution, and 6.0 g of activated carbon powder (specific surface area=1,600 m²/g), 0.5 g of carbon black (average diameter=19 nm) are mixed to provide an anion exchange electrode slurry. Then, the anion exchange electrode slurry is coated on a conductive graphite sheet (thickness=380 μm) by a doctor blade method to provide a 200 μm thick coating on a side and the resulting product is dried at room temperature to provide an positive electrode having an anion exchange group.

3) Assembly of Capacitive Deionization Apparatus

The negative electrode having a cation exchange group obtained from the procedure as set forth in item 1) and the positive electrode having an anion exchange group obtained from the procedure as set forth in item step 2) are used as the electrode and the spacer prepared from Preparation Example 2 is used as a spacer structure to provide an assembly, wherein a graphite sheet/an positive electrode having an anion exchange group (thickness: 200 μm)/spacer/a negative electrode having a cation exchange group (thickness: 200 μm)/a graphite sheet are stacked in a housing, as shown in FIG. 1(C). The housing is fastened with a screw.

Comparative Example 2

An apparatus is fabricated using the same electrode as in Example 2 and in the same manner as set forth in Example 2, except that the spacer structure is a polyethylene terephthalate mesh (Trade name: PETEX 07, 120/34, Sefar AG) without a Nafion coating.

Example 3

A device is fabricated using the same electrode as in Example 2 and in the same manner as set forth in Example 2, except for using the spacer structure obtained from Preparation Example 1.

Comparative Example 3

An apparatus is fabricated with using the same electrode as in Example 2 and in the same manner as set forth in Example 2, except that the spacer structure is a polyamide mesh (Trade name: NITEX 03 (125/45, Sefar AG)) including no Nafion coating.

Example 4: Manufacturing Capacitive Deionization Apparatus Including Ion Exchange Membrane (MCDI)

1) Manufacture of Electrode: Electrode Coated with Activated Carbon Slurry

An electrode coated with an activated carbon slurry is prepared in the same manner as set forth in Example 1.

2) Assembly of Capacitive Deionization Apparatus

The sheet electrodes obtained from the procedure as set forth in item 1) are used as an positive electrode and a negative electrode; CMX and AMX manufactured by Tokuyama are used as a cation exchange membrane and an anion exchange membrane, and the spacer structure obtained from Preparation Example 1 are used as a spacer to prepare an assembly, wherein graphite sheet/activated carbon electrode coating (thickness: 200 μm)/cation exchange membrane/spacer/anion exchange membrane/activated carbon electrode coating (thickness: 200 μm)/graphite sheet are stacked in a housing, as shown in FIG. 1(B). The housing is fastened with a screw.

Comparative Example 4

An apparatus is fabricated with using the same electrode as Example 4 and in the same procedure as in Example 4, except that the spacer structure is a polyamide mesh (Trade name: NITEX 03-125/45, Sefar AG)) without a Nafion coating.

Experimental Example 2: Evaluation of Ion Removal Performance

In accordance with the procedure set forth below, ion adsorption removal tests are conducted for each apparatus obtained from Example 1 and Comparative Example 1, Example 4 and Comparative Example 4, Example 2 and Comparative Example 2, and Example 3 and Comparative Example 3, respectively, and the results are shown in FIG. 4 to FIG. 7, respectively.

(1) The apparatus is operated at room temperature and supplied with a 100 ppm NaCl solution (ion conductivity: about 200 uS/cm) at a rate of 50 ml/minute.

(2) An electric power source is connected to each electrode, and the cell voltage (the potential difference between the positive electrode and the negative electrode) is maintained at 1.2 V for 150 seconds to conduct deionization.

(3) With respect to the treated solution passing through the apparatus and being discharged, the conductivity is measured in real time using a flow-type conductivity meter.

(4) For each step, the quantity of electric charge is calculated from the product of the electric current supplied by the electric power source and the time that the electric current is applied.

(5) Discharge: 100 ppm of NaCl is sufficiently flowed to a CDI unit cell until no apparent current flows (in other words, the electric charge as being charged in the deionization process is totally discharged, for example, for 10 minutes). The flow rate is 10 mL/min, and the voltage is 0 V.

(6) The ion removal (%) of each apparatus is calculated from the ion conductivity of solution as measured with a flow-type conductivity meter using the following equation:

ion removal rate (%)=[(conductivity of feed solution−conductivity of discharged solution)/(conductivity of feed solution)]*100

Figure 4:
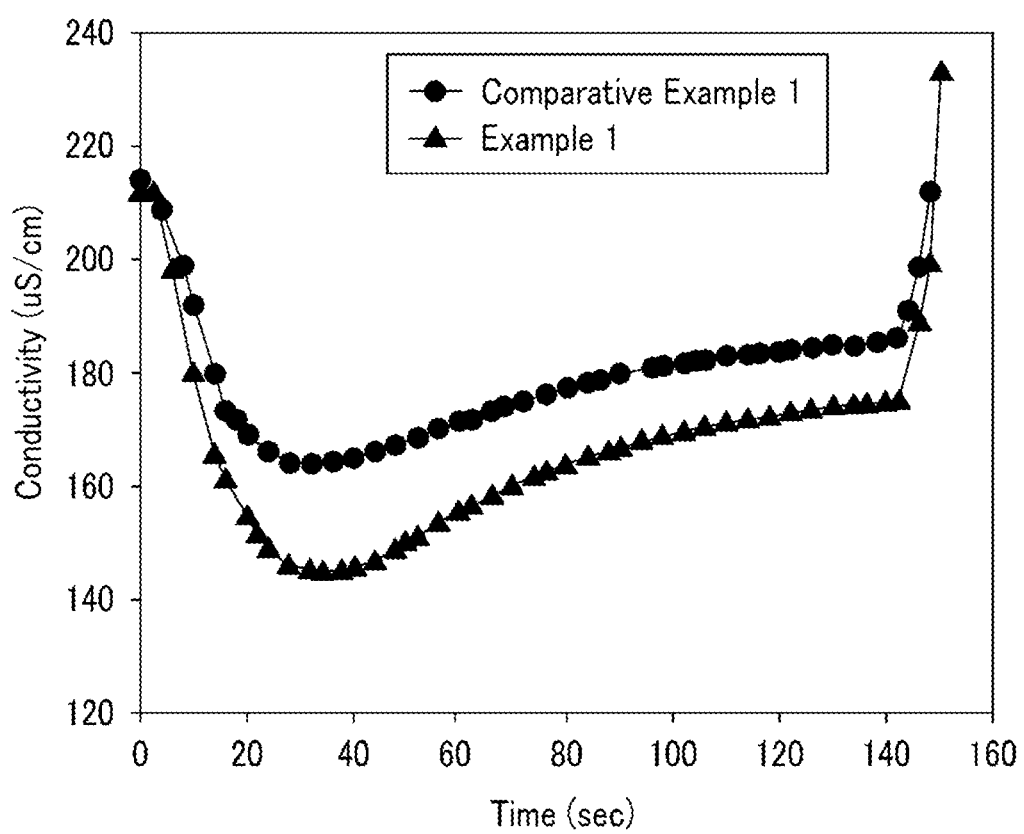
FIG. 4 is a graph plotting changes in conductivity over time when ion adsorption removal tests are performed with the capacitive deionization apparatuses obtained from Example 1 and Comparative Example 1.

FIG. 4 shows the results of performing the ion adsorption removal tests on the apparatuses obtained from Example 1 and Comparative Example 1. Specifically, the apparatus of Comparative Example 1 shows an ion removal efficiency of 23.7%; while, the apparatus of Example 1 shows an ion removal efficiency of 32.5%, which is higher than that of Comparative Example 1 by about 9%.

Figure 5:
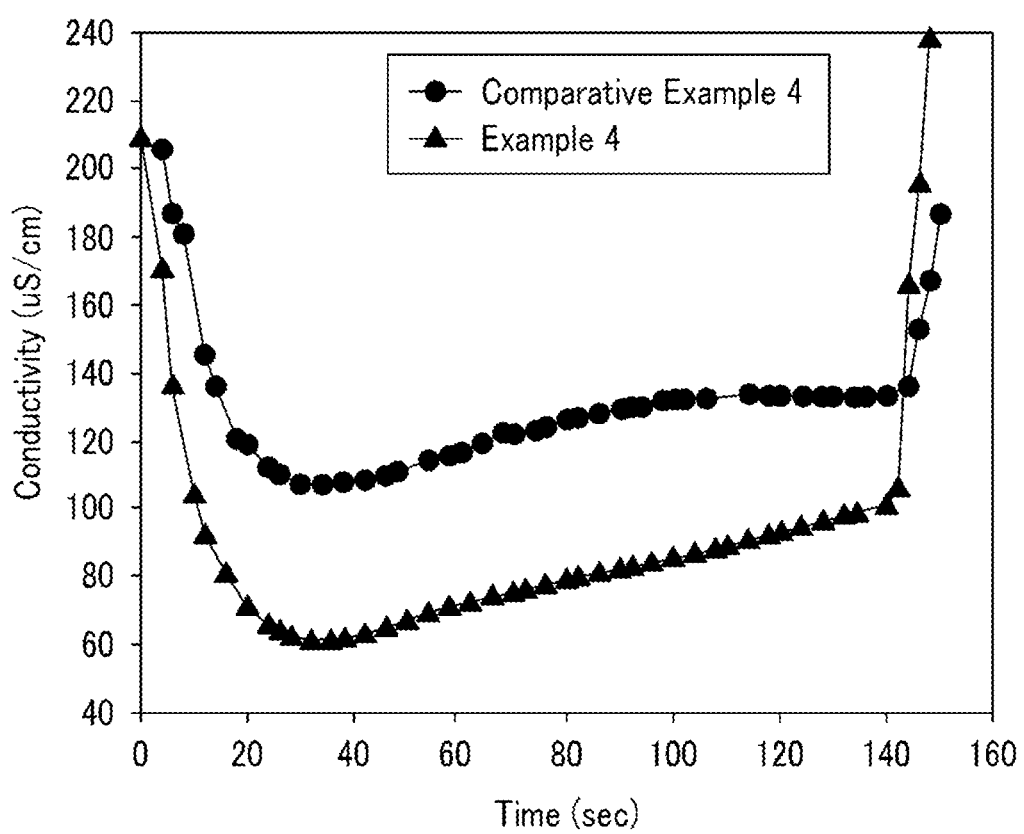
FIG. 5 is a graph plotting changes in conductivity over time when ion adsorption removal tests are performed with the capacitive deionization apparatuses obtained from Example 4 and Comparative Example 4.

FIG. 5 illustrates the results of performing the ion removal tests on the apparatuses obtained from Example 4 and Comparative Example 4. Specifically, the apparatus of Comparative Example 4 shows an ion removal efficiency of 48.6%; whereas, the apparatus of Example 1 shows an ion removal efficiency of 70.6%, which is higher than that of Comparative Example 4 by about 22%.

Figure 6:
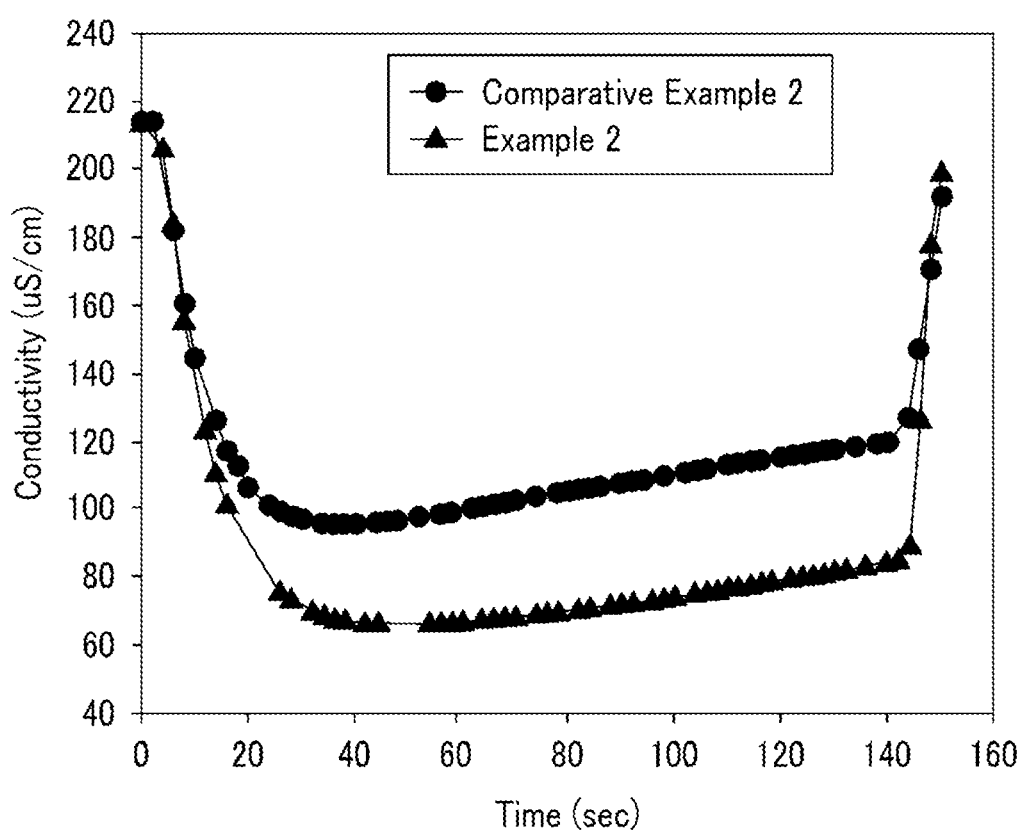
FIG. 6 is a graph plotting changes in conductivity over time when ion adsorption removal tests are performed with the capacitive deionization apparatuses obtained from Example 2 and Comparative Example 2.

FIG. 6 illustrates the results of performing the ion removal tests on the apparatuses obtained from Example 2 and Comparative Example 2. Specifically, the apparatus of Comparative Example 2 has an ion removal efficiency of 55.0%; whereas, the apparatus of Example 2 has an ion removal efficiency of 68.8%, which is higher than that of Comparative Example 2 by about 13%.

Figure 7:
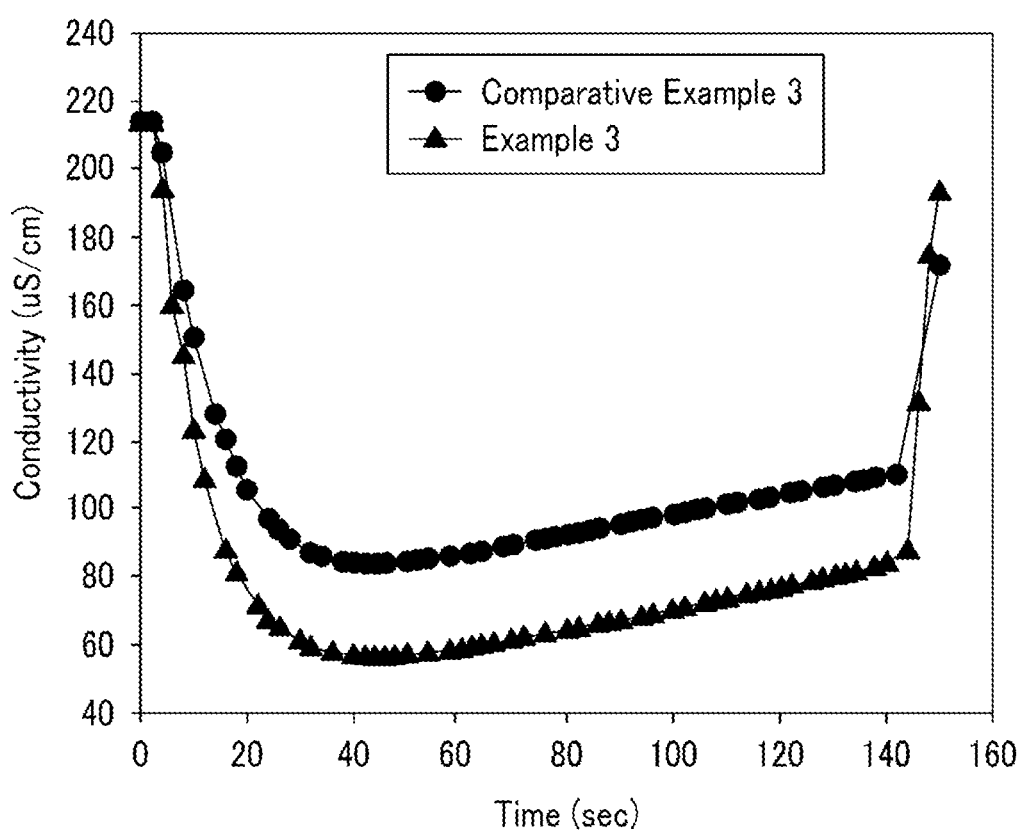
FIG. 7 is a graph plotting changes of conductivity over time when ion adsorption removal tests are performed with the capacitive deionization apparatuses obtained from Example 3 and Comparative Example 3.

FIG. 7 illustrates the results of the ion removal tests performed on the apparatus obtained from Example 3 and Comparative Example 3. Specifically, the apparatus of Comparative Example 3 has ion removal efficiency of 60.8%; whereas, the apparatus of Example 3 has ion removal efficiency of 73.4%, which is higher than that of Comparative Example 3 by about 13%.

Experimental Example 3: Evaluation of Ion Removal Performance Depending on the Flow Rate The ion removal tests are performed with the apparatus of Example 3 and Comparative Example 3 according to the same procedure as set forth in Experimental Example 2, except that the flow rate of the feed solution is at a rate of 12 ml/min, 14 ml/min, and 15 ml/min, respectively, synthetic hard water having an electrolyte concentration of 250 ppm (as $CaCO_3$) is used as a feed solution, and the voltage being applied is 1.5 V. The results are shown in FIG. 8.

Figure 8:
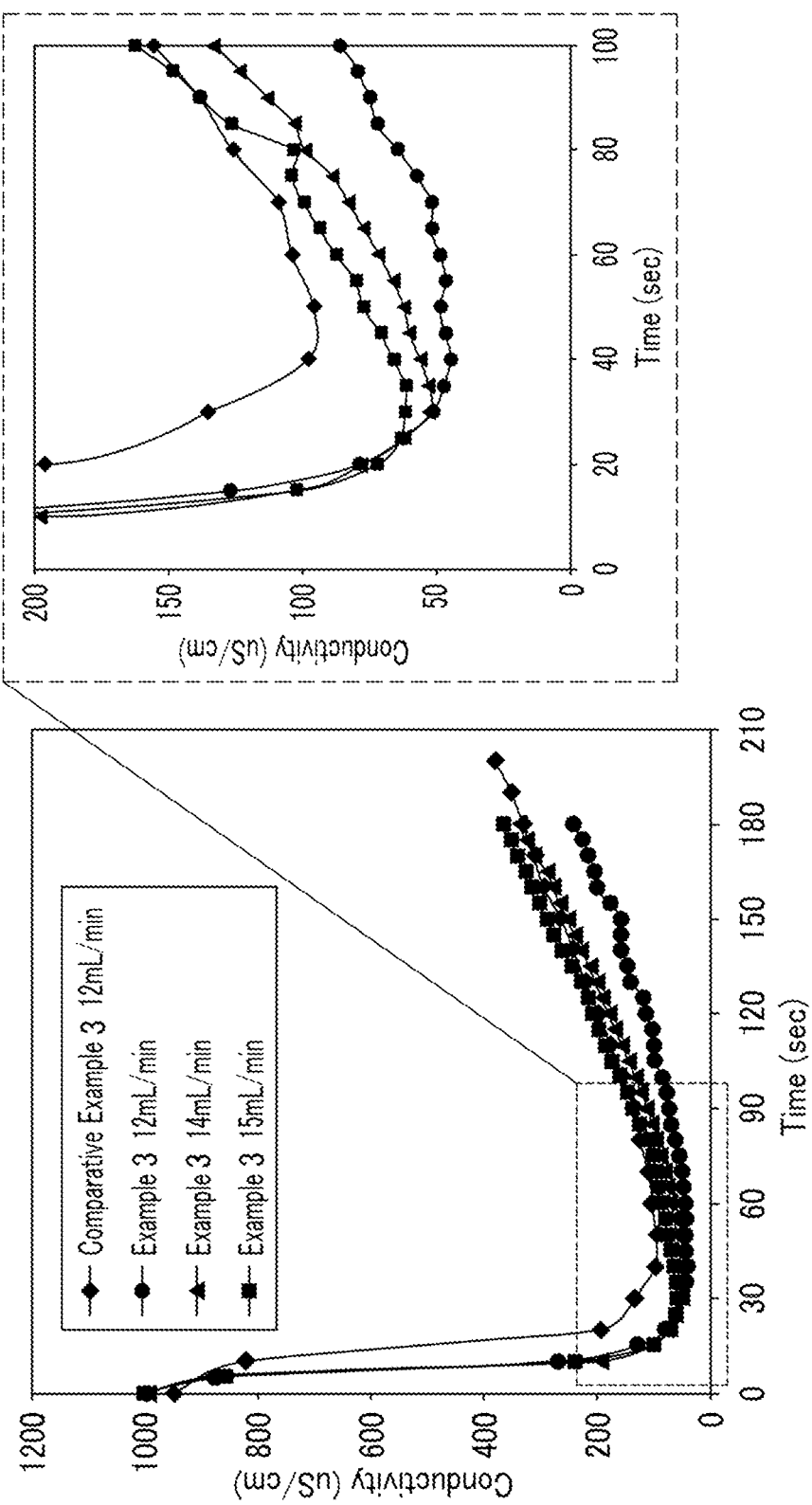
FIG. 8 is a graph plotting changes in conductivity over time when ion adsorption removal tests are performed with the capacitive deionization apparatuses obtained from Example 3 and Comparative Example 3 while supplying the ion-containing solution at different flow rates, and the inset shows the results for a time period of 0 to 100 seconds in a magnified view.

In FIG. 8, the inset shows the results for the time period of 0 to 100 seconds on an enlarged scale. It may be understood that the apparatus of Example 3 may remove ions with higher efficiency than the apparatus of Comparative Example 3.

While various examples have been disclosed herein, it is to be understood that the present application is not limited to the disclosed embodiments. Instead, the present disclosure is intended to cover all modifications and equivalent arrangements included within the spirit and scope of the appended claims.

What is claimed is:

1. A capacitive deionization apparatus comprising:
   at least one pair of porous electrodes including an electrode material, the electrode material having a surface area that facilitates electrostatic adsorption of feed ions; and
   a spacer structure disposed between the at least one pair of porous electrodes, the spacer structure including an electrically-insulating material and an ion exchange polymer coating on a surface of the electrically-insulating material, the ion exchange polymer coating including an ion exchange group, the spacer structure defining a path for flowing a fluid therethrough, and the path extending along a surface of the spacer structure,
   wherein the ion exchange polymer coating is different from the electrically-insulating material,
   wherein the electrically-insulating material includes a polyester, a polyolefin, a polyamide, an aromatic vinyl polymer, cellulose, a cellulose derivative, a polyetherether ketone, a polyimide, a polyvinylchloride, or a combination thereof, and
   wherein the spacer structure has an open mesh including a mesh opening.

2. The capacitive deionization apparatus of claim 1, further comprising:
   a charge barrier disposed between the at least one pair of porous electrodes and the spacer structure, the charge barrier including a material that is different from the electrode material.

3. The capacitive deionization apparatus of claim 2, wherein the charge barrier is a cation permselective membrane or an anion permselective membrane.

4. The capacitive deionization apparatus of claim 1, wherein the at least one pair of porous electrodes includes a conductive agent and a binder.

5. The capacitive deionization apparatus of claim 4, wherein the binder is an ion conductive binder.

6. The capacitive deionization apparatus of claim 5, wherein the ion conductive binder is a polymer having a cation exchange group or an anion exchange group, the cation exchange group selected from a sulfonic acid group (—$SO_3H$), a carboxyl group (—COOH), a phosphonic acid group (—$PO_3H_2$), a phosphinic acid group (—$HPO_3H$), an arsenic acid group (—$AsO_3H_2$), and a selenonic acid group (—$SeO_3H$), the anion exchange group selected from a quaternary ammonium group (—$NH_3^+$), a primary amine (—$NH_2$), a secondary amine (—NHR), a tertiary amine group (—$NR_2$), a quaternary phosphonium group (—$PR_4^+$), and a tertiary sulfonium group (—$SR_3^+$).

7. The capacitive deionization apparatus of claim 6, wherein the polymer is selected from polystyrene, polyvinylalcohol, carboxylmethylcellulose, hydroxypropylcellulose, polyvinylchloride, carboxylated polyvinylchloride, polyvinylfluoride, polyamide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and polyacrylamide.

8. The capacitive deionization apparatus of claim 1, wherein the electrode material includes at least one porous material selected from activated carbon, an aerogel, carbon nanotubes (CNT), mesoporous carbon, activated carbon fiber, graphite oxide, and a metal oxide.

9. The capacitive deionization apparatus of claim 1, wherein an open area within the spacer structure is about 20% to about 80% of the spacer structure.

10. The capacitive deionization apparatus of claim 1, wherein the open mesh includes a polyester, polyamide, or a combination thereof.

11. The capacitive deionization apparatus of claim 1, wherein the spacer structure has a thickness of about 50 μm to about 500 μm and an open area within the spacer structure of about 20% to about 80% of the spacer structure.

12. The capacitive deionization apparatus of claim 1, wherein the spacer structure has an equivalent series resistance (ESR) of about 1 ohm to about 300 ohms/cm², as measured under an electrolyte condition of 20 mg/L NaCl.

13. The capacitive deionization apparatus of claim 1, wherein the spacer structure has an ion exchange capacity of about 0.01 meq/g to about 10 meq/g.

14. The capacitive deionization apparatus of claim 1, wherein the ion exchange polymer is selected from a sulfonated tetrafluoroethylene-based fluoro polymer-copolymer, a carboxylated polymer, a sulfonated polymer, a sulfonated polystyrene, polyethyleneimine, poly(acrylamido-N-propyltrimethylammonium chloride (PolyAPTAC), poly (2-acrylamido-2-methyl-1-propanesulfonic acid (PolyAMPS), and a combination thereof.

15. The capacitive deionization apparatus of claim 1, wherein the ion exchange polymer coating has a thickness of about 0.5 μm to about 50 μm.

16. The capacitive deionization apparatus of claim 1, wherein the ion exchange group is a cation exchange group or an anion exchange group, the cation exchange group selected from a sulfonic acid group (—$SO_3H$), a carboxyl group (—COOH), a phosphonic acid group (—$PO_3H_2$), a phosphinic acid group (—$HPO_3H$), an arsenic acid group (—$AsO_3H_2$), and a selenonic acid group (—$SeO_3H$), the anion exchange group selected from a quaternary ammonium group (—NH$_3^+$), a primary amine (—NH$_2$), a secondary amine (—NHR), a tertiary amine group (—NR$_2$), a quaternary phosphonium group (—PR$_4^+$), and a tertiary sulfonium group (—SR$_3^+$).

17. A method of treating a fluid comprising:
providing the capacitive deionization apparatus of claim 1;
supplying the fluid through the path defined by the spacer structure, the fluid including the feed ions; and
applying a voltage between the at least one pair of porous electrodes to adsorb the feed ions onto the at least one pair of porous electrode so as to remove the feed ions from the fluid.

18. The method of claim 17, further comprising:
short-circuiting the at least one pair of porous electrodes or applying a reverse-direction voltage between the at least one pair of porous electrodes to detach the adsorbed feed ions.

\* \* \* \* \*